June 29, 1965 F. M. JOHNSON 3,192,038
METHOD OF EXTRACTING ALKALI METALS
Filed Jan. 23, 1963 2 Sheets-Sheet 1

INVENTOR.
FRED M. JOHNSON
BY
W.S. Hill
AGENT

June 29, 1965 F. M. JOHNSON 3,192,038
METHOD OF EXTRACTING ALKALI METALS
Filed Jan. 23, 1963 2 Sheets-Sheet 2

INVENTOR.
FRED M. JOHNSON
BY
W.S. Hill
AGENT 3,192,038
METHOD OF EXTRACTING ALKALI METALS
Fred M. Johnson, Princeton, N.J.
(213 S. Madison Ave., Monrovia, Calif.)
Filed Jan. 23, 1963, Ser. No. 253,435
7 Claims. (Cl. 75—66)

The present invention relates to an improved method of extracting the elements lithium, sodium, potassium, rubidium and cesium (the alkali metals) from certain of their ores. More particularly it relates to a method of extracting these metals from minerals having the general formula $R_2O.Al_2O_3.nSiO_2$, where R is one or more of the alkali metals, and $n$ is an even number from 2 to 8.

To mention one example of how the alkali metals have previously been extracted from this type of ore, lithium, for example, has previously been extracted from spodumene ($Li_2O.Al_2O_3.4SiO_2$) in a lengthy and expensive process including heating with limestone to convert the lithium to the hydroxide, converting the lithium hydroxide to its chloride, and then electrolyzing this salt in molten state to recover the elemental lithium. The process is complicated by the fact that lithium is a very active metal which quickly oxidizes when exposed to air. The metal must therefore be collected in the absence of air—as in a vacuum.

An object of the invention is to provide an improved process of extracting alkali metals from certain alumino silicates.

A further object is to provide a process of extracting alkali metals from alumino silicates which process is more economical and efficient than previously used commercial processes.

A further object is to provide a method of extracting alkali metals directly from certain ores without chemical processing.

Briefly, the present invention comprises heating the ore containing the alkali metal being extracted, in the absence of air, for example in a vacuum chamber, to a selected temperature below the melting point of the ore and applying a particular negative potential to a collecting electrode with respect to another electrode which makes electrical contact with the ore, to extract alkali metal ions and collect them on the collecting electrode surface.

Figure 1:
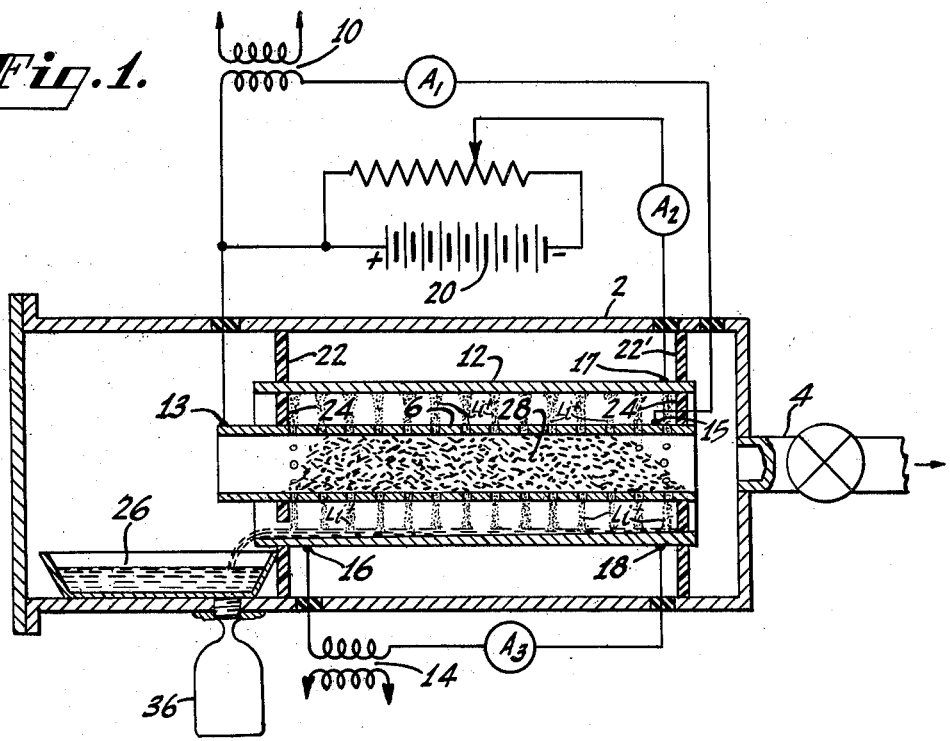
Figure 2:
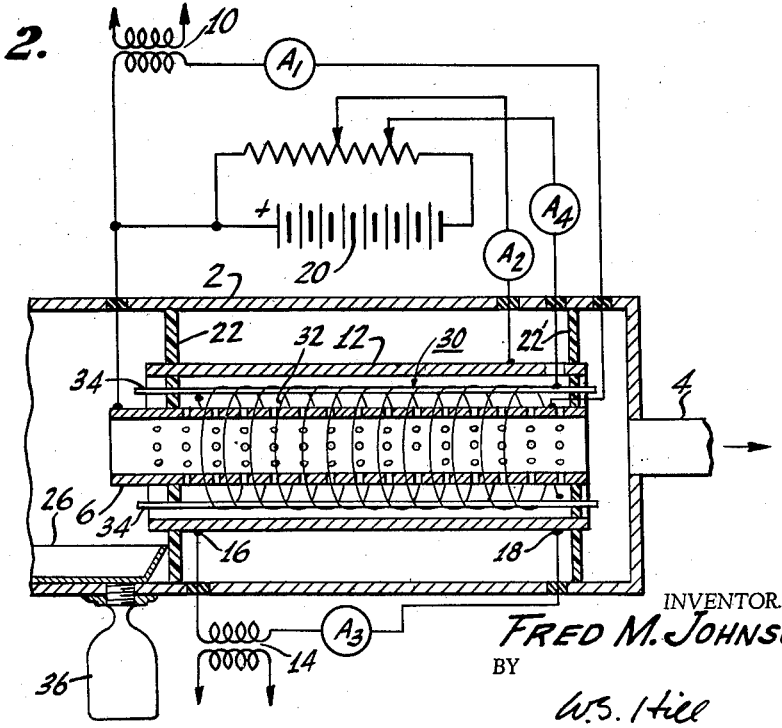
Figure 3:
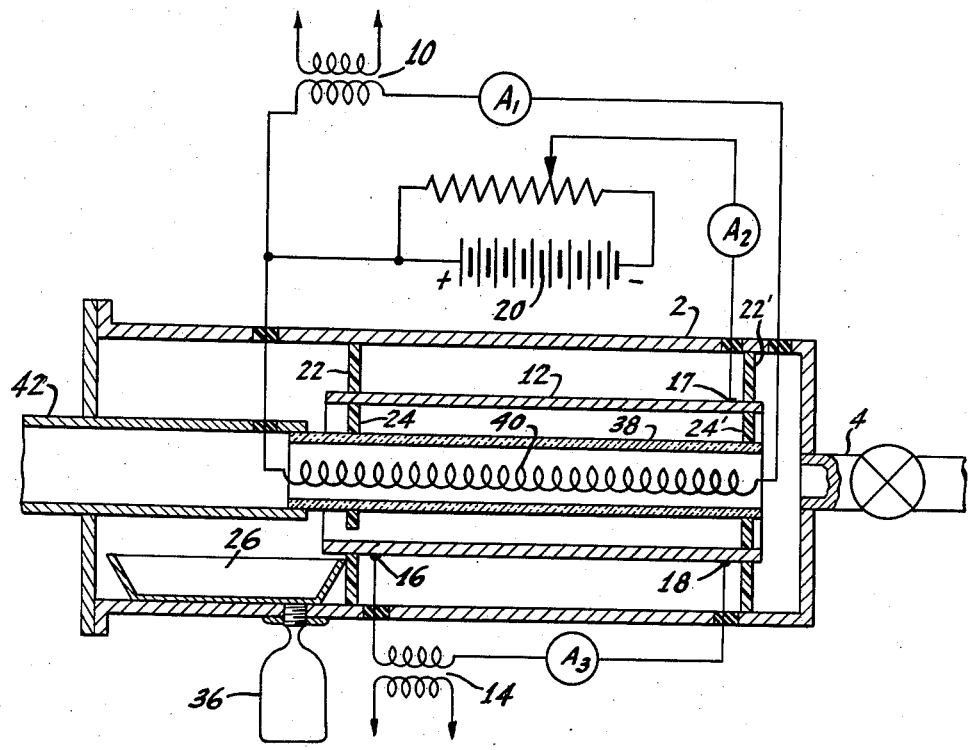

The process will now be more specifically described with reference to the drawing of which FIGURE 1 is a partially diagrammatic section view of apparatus suitable for carrying out one of the modifications of the extraction methods of the invention;

FIGURE 2 is a view similar to that of FIGURE 1 of an alternative embodiment of apparatus for carrying out the methods of the invention, and FIGURE 3 is a view similar to that of FIGURES 1 and 2 of a third embodiment of apparatus for carrying out the methods of the invention.

Referring now to FIGURE 1, suitable apparatus for carrying out one form of the method may comprise a vacuum chamber 2 connected by an air line 4 to a vacuum pump (not shown). Within the chamber is a first electrode 6 in the form of a perforated hollow cylinder adapted to contain a quantity of the ore. This electrode may be made of tungsten, for example, or molybdenum which is flash-coated with platinum. The electrode must be able to withstand high temperatures and not be subject to attack by lithium ions. This electrode is resistance-heated, preferably by passing an alternating current through it from a source 10 connected to terminals 13 and 15 adjacent the ends of the electrode.

Spaced a convenient distance, such as a few millimeters, from the first electrode 6 is a second electrode 12, which may also be made of platinum-coated molybdenum. This electrode is also in the form of a hollow cylinder disposed concentrically around the first electrode 6. It is also resistance-heated from a separate source 14 of alternating current, which is connected to the electrode 12 by means of end terminals 16 and 18.

The electrodes are also connected to a source 20 of direct current such that the inner electrode 6 is positive and the outer electrode 12 is negative. The negative side of the current source 20 is connected to a terminal 17 on the electrode 12. The positive side of the current source 20 is connected to a terminal 13 on electrode 6.

The outer electrode 12 is insulatingly supported within the vacuum chamber 2 by means of rings 22 and 22' made of a refractory ceramic such as alumina. The inner electrode 6 is supported in a similar manner within the outer electrode 12 with ceramic rings 24 and 24'. Ceramic ring 24 is partially cut away on its lower portion to permit liquid flow out of electrode 12.

A collecting pan 26 of molybdenum which is flash-coated with platinum is provided beneath one end of the outer electrode 12 to collect molten impurities which are first produced as later described. Electrode 12 is also slightly tapered in thickness from right to left to cause liquid to flow out of its left end.

A typical embodiment of the process will be described with respect to extracting lithium from spodumene. To carry out this embodiment, a quantity of spodumene ore is crushed and powdered as finely as convenient. The process becomes more efficient the more finely the ore is subdivided. The powdered ore is packed within the perforated inner electrode 6.

If it is desired to obtain the lithium in a substantially pure form, it must first go through a purification step. This consists in heating the ore for a period of time at a temperature high enough to remove gaseous impurities and then to heat the ore while maintaining a potential across the electrodes of the apparatus to extract ions of other alkali metals which are usually associated with the one being principally extracted. In the case of extracting lithium from spodumene ore, the inner electrode is gradually heated to a temperature of about 1300° C. which drives off a number of different gases such as methane, hydrogen, water vapor, carbon dioxide and carbon monoxide. In a laboratory run, the total gas pressure measured subsequent to the treatment was less than $4 \times 10^{-8}$ mm. The gases are removed by vacuum pumping. The temperature is then lowered to 1100° C. Then, with a potential of minus 50 volts on the collecting electrode with respect to the emitting electrode, the other alkali metals present are extracted as ions and collected on the collecting electrode. The outer electrode is maintained at a high enough temperature to melt these impurities as they are deposited so that they run off and are collected in tray 26.

When substantially all the impurities are removed, the potential is removed from across the electrodes and the heating stopped. After cooling, the vacuum is broken, the chamber is opened, and the collecting tray is removed. It is also preferable to substitute a clean collecting electrode before again evacuating the chamber and starting to collect the lithium.

The inner electrode 6 is now heated up to about 1300° C. and a potential of about 300 volts is placed across the terminals 13 and 17. These conditions are maintained until all available lithium, emitted in the form of ions, is extracted from the ore. The lithium ions are collected on the inner surface of electrode 12. The lithium ion current is of the order of milli-amps per square centimeter. The lithium is collected by melting the lithium as it collects on the inner surface of electrode 12 and causing it to run off into a container which can be sealed while still under vacuum. The container may, for example, be a copper tube or flask 36 sealed to the wall of the chamber 2 just beneath the outflow from electrode 12. When the flask is filled with lithium, it can be pinched off and removed.

The melting temperature of spodumene ore is about 1400° C. The temperature to which the ore is heated in the present process is always below the melting temperature. In the initial processing step, however, it is permissible to heat the spodumene slightly above its melting point for a very brief period. This step results in the coalescing of the powder into a solid glassy substance and provides improved thermal and electrical contact to the inner electrode 6.

If the voltage across the electrodes is too high, sputtering of the electrodes occurs. Since this contaminates the lithium (or other alkali metal being collected), sputtering must be prevented.

The inner electrode 6 from which the ion current is emitted, may be termed the emitting electrode. The outer electrode may be called the collecting electrode. The emission current is given by the following equation:

$$I_s = AST^2 \exp\left[\frac{-e\phi}{kT} + \frac{Ce(eE)^{1/2}}{kT}\right] \text{amperes}$$

where $I_s$ is ion saturation current
$A$ is emission constant in amperes/cm.$^2$
$S$ is emitting electrode area in cm.$^2$
$T$ is emitting electrode temperature in degrees Kelvin
$\phi$ is emitting electrode work function for alkali ions, e.g. (Li$^+$)
$k$ is Boltzmann's constant
$e$ is electronic charge
$E$ is potential gradient from emitting to collecting electrode, which equals $V/d$ for a plane parallel electrode, $d$ being the spacing between electrodes
$C$ is a constant
$V$ is the potential difference between emitting and collecting electrodes.

At lower values of V, the amount of ion emission that can be obtained in the apparatus is space charge-limited. Thus, increasing the temperature, for example, at low voltages, results in little or no increase in ion current. But as V reaches higher and higher levels, ion emission is no longer space charge-limited and use of higher temperatures can be used to increase intensity of the lithium ion current and hence the rate with which all available lithium can be extracted from the ore.

For plane parallel electrodes, the relation between space charge-limited ion current $I_c$ and spacing between emitting and collecting electrodes $d$ is given by $$\frac{I_c}{S} \cong P(V-IR)^{1/2}$$

$$P = \frac{2.33 \times 10^{-6}}{d^2}\sqrt{\frac{m}{M}}$$

$R$ = resistance of the ore plus the electrode where $m$ = mass of the electron
$M$ = mass of the alkali metal ion and $d$ is measured in cm.

For lithium, $$\sqrt{\frac{m}{M}} \text{ about } \frac{1}{100}$$

For concentric cylindrical electrodes, $$P \cong \frac{2.33 \times 10^{-6}}{d_1^2}\left(\frac{r_2}{r_1}\right)\sqrt{\frac{m}{M}}$$

$$d_1 = r_2 - r_1$$

$r_1$ = distance from the central axis of the system to the inner electrode
$r_2$ = distance from the central axis of the sytem to the outer electrode
$I_c$ must be larger than $I_s$ (the saturation current) in order that ion emission shall not be space-charge limited.

It is therefore apparent that electrode spacing should be as small as proves practical from other considerations and that V, the potential drop between electrodes, should be as high as practical.

Electrode spacing, potential difference and pressure are themselves interrelated in that, for a given electrode spacing, too high a potential results in arcing, also sputtering and secondary electron emission from the collector.

In order to increase the intensity of the ion current being collected by the collecting electrode 12, and thus speed up the process, it is desirable to be able to increase the potential difference between the emitting and collecting electrodes. However, when the potential between the electrodes is increased there is a tendency for sputtering to occur. In order to suppress this unwanted effect, a grid 30 may be disposed between the emitting electrode 6 and the collecting electrode 12 as shown in FIGURE 2. As shown in FIGURE 2, the grid may comprise a spiral of wire 32 wound on a wire frame 34 which is supported at its ends by the ceramic discs 24 and 24'. As an example, the grid may be operated at about 300 to 500 v. negative when the collector is at −40 volts.

Another modification which may be made in the method of the present invention is to substitute a non-perforated cylindrical electrode of platinum for the perforated inner cylinder 6. In accordance with the present invention, it has been found that if the spodumene is packed within a thin-walled platinum tube, and potentials and temperatures applied as described above, lithium ions will diffuse rapidly through the walls of the tube and then can be collected on the inner surface of electrode 12.

Still another modification of the method will now be described with reference to FIGURE 3. In this modification, a porous ceramic cylinder is used to contain the spodumene ore and the heat is generated by means of a current passed through a resistance wire embedded in the ore. Referring now to FIGURE 3, the lithium-containing ore is packed within a cylinder 38 made of a ceramic such as steatite. Thickness of the wall of the cylinder may, for example, be one-eighth inch but this may be varied considerably. Running through the middle of the cylinder 38, from end-to-end, is a resistance wire 40, which may be of platinum, tungsten or molybdenum, for example. The ends of this wire are connected to A.-C. current source 10 and one end of the wire 40 is also connected to the positive side of D.-C. potential source 20. In addition to the pipe 4 connecting the interior of the apparatus to a vacuum pump, it is desirable to connect the ceramic cylinder 38 directly to a separate vacuum pump (not shown) by a pipe 42.

The method of this modification is carried out much as described in the previous examples, except that, now, current is passed through the resistance wire 40 so that it heats up to a temperature of at least about 1100° C. The spodumene ore packed around the wire also heats up to about this temperature as does the ceramic cylinder 38. A potential of 150 volts is applied between the wire 40 and the collecting electrode. Under these conditions, lithium ions diffuse out through the walls of the ceramic cylinder and are attracted to the collecting electrode. In an experimental run using laboratory size equipment, an ion current of about 20 milli-amps per sq. cm. was obtained.

In order to more accurately control the temperature of the collecting electrode, so that the lithium does not become too hot, suitable cooling means, such as fins, or pipes through which a cold liquid is circulated, may be disposed on the outer surface of the collecting cylinder.

Examples of ores from which lithium may be extracted in accordance with the present invention, in addition to spodumene, are eucryptite, lithium orthoclase and petalite. Sodium-containing ores are nepheline, jadeite and albite. Potassium-containing ores are kaliophilite, leucite and feldspathorthose. A cesium-containing ore is pollucite.

Lithium is readily separated from the other alkali metals associated with it as impurities since it requires the highest temperature to extract it as ions from its ore under particular voltage conditions. The other alkali metal ions can be extracted at progressively lower temperatures in the series cesium, rubidium, sodium and potassium.

Another way to separate the ions of the alkali metals is to take advantage of the differences in their ionic diameters. They may be diffused through ceramic semi-permeable membranes of different pore sizes.

What is claimed is:

1. A method of extracting alkali metals from an ore having the general formula $R_2O.Al_2O_3.nSiO_2$ where R is at least one alkali metal and $n$ is an even number from 2 to 8, comprising heating a quantity of the ore in vacuo and in electrical contact with a first electrode, to a high temperature below the melting point of said ore, and applying a negative potential to a collecting electrode with respect to said first electrode such as to extract alkali metal ions from said ore and attract said ions to said collecting electrode.

2. A method of extracting lithium metal from spodumene comprising heating a quantity of spodumene in vacuo and in electrical contact with a first electrode, to a first high temperature which is below the melting point of said spodumene, and applying to a collecting electrode a potential which is negative with respect to said first electrode, said first temperature and said negative potential being just sufficient to extract from said spodumene alkali metals other than lithium which may have been present as impurities in said spodumene, and then heating said spodumene to a somewhat higher temperature below the melting point of said spodumene and applying to said collecting electrode a negative potential higher than said previously applied potential so as to extract lithium ions from said spodumene and attract them to the surface of said collecting electrode.

3. A method of extracting alkali metals from an ore having the general formula $R_2O.Al_2O_3.nSiO_2$ where R is at least one alkali metal and $n$ is an even number from 2 to 8, comprising heating a quantity of the ore in vacuo and in electrical contact with the interior of a first metallic cylindrical electrode having perforated walls, to a high temperature below the melting point of said ore, and applying a negative potential to a collecting electrode with respect to said first electrode such as to extract alkali metal ions from said ore and to cause said ions to travel through the perforations of said first electrode to said collecting electrode.

4. A method of extracting lithium metal from spodumene comprising heating a quantity of spodumene in vacuo and in electrical contact with the interior of a thin-walled cylindrical platinum electrode, to a high temperature below the melting point of said spodumene, and applying a negative potential to a collecting electrode with respect to said platinum electrode such as to extract lithium ions from said spodumene and to cause said ions to diffuse through the walls of said platinum electrode to said collecting electrode.

5. A method of extracting alkali metals from an ore having the general formula $R_2O.Al_2O_3.nSiO_2$ where R is at least one alkali metal and $n$ is an even number from 2 to 8, comprising heating a quantity of the ore in vacuo and in electrical contact with a first electrode, to a high temperature below the melting point of said ore, and applying a negative potential to a collecting electrode with respect to said first electrode such as to extract alkali metal ions from said ore and attract said ions to said collecting electrode, while maintaining a negative potential higher than that of said collecting electrode in the space between said first electrode and said collecting electrode to inhibit sputtering.

6. A method of extracting alkali metals from an ore having the general formula $R_2O.Al_2O_3.nSiO_2$ where R is at least one alkali metal and $n$ is an even number from 2 to 8, comprising heating a quantity of the ore in vacuo and in electrical contact with a first electrode within a porous ceramic cylinder, to a high temperature below the melting point of said ore, and applying a negative potential to a collecting electrode with respect to said first electrode such as to extract alkali metal ions from said ore and to cause ions to diffuse through the walls of said cylinder and travel to said collecting electrode.

7. A method of extracting lithium metal from spodumene comprising heating a quantity of spodumene in vacuo and in electrical contact with a first electrode, to a temperature of about 1100° C. while applying to a collecting electrode a potential of about minus 50 volts with respect to said first electrode, to extract from said spodumene alkali metals other than lithium which may be present as impurities in said spodumene, and then heating said spodumene to a temperature of about 1300° C. while applying a potential of about minus 300 volts to said collecting electrode with respect to said first electrode such that lithium ions are extracted from said spodumene and attracted to the surface of said collecting electrode.

References Cited by the Examiner

UNITED STATES PATENTS

| 679,253 | 7/01 | Cowles | 75—10 |
|---|---|---|---|
| 2,424,512 | 7/47 | Stauffer | 75—66 |
| 3,101,308 | 8/63 | Sheer et al. | 204—164 |

FOREIGN PATENTS 393,092  6/33  Great Britain.

OTHER REFERENCES

"Steel," Sept. 26, 1960, pages 110–112.

BENJAMIN HENKIN, *Primary Examiner.*

DAVID L. RECK, *Examiner.*